3,306,763
METHOD OF MAKING HEAT SENSITIVE RECORDING SHEET
William H. Hoge, Rumford, Maine, assignor to Oxford Paper Company, Rumford, Maine, a corporation of Maine
No Drawing. Filed Sept. 3, 1963, Ser. No. 306,358
3 Claims. (Cl. 117—36.7)

This invention is a continuation-in-part of my copending application, Serial No. 89,380, filed February 15, 1961, now abandoned, and relates to heat sensitive recording material, and more particularly to a heat sensitive recording material comprising a backing having, adhered thereto, an opaque porous coating comprising discrete, microscopic, thermoplastic resin particles and an adhesive which is in an amount sufficient to hold the resin particles together, but insufficient to completely fill the voids between the resin particles, whereby the coating is capable of being transparentized in response to a heated stylus so as to disclose the underlying surface.

Heat sensitive recording papers have been proposed for use in connection with recording instruments wherein a heated stylus is employed in place of the ink-fed pen for marking a paper chart. These heat-sensitive papers, however, have not been entirely successful. Several techniques which have been proposed involve dissolving or partially dissolving a film forming thermoplastic resin (such as ethyl cellulose) in a volatile organic solvent. In one case, for example, the organic solvent is water-miscible (such as acetone), and in another case, it is water immiscible (such as toluene). According to both procedures, water is then added to the resin solution. In the first case, the water causes a "blushing" phenomenon to occur and, in the second case, the water becomes emulsified in the solvent system. The result is a resin-solvent system in which there is dispersed a multiplicity of minute water droplets and/or precipitated resin particles. When a film is cast from the resulting mixture and when it is dried and the organic solvent and water removed, an opaque coating is obtained. The opacity is derived from the multiplicity of voids present in the otherwise homogeneous film. The coatings are heat-sensitive because, when the thermoplastic film is softened, the voids are elminated.

The resin solvent techniques discussed above involve solvent coating procedures. Compared to the water-based coating procedure, such as described bleow in this invention, solvent procedures are inherently more expensive, more complex, and more hazardous. Because of such disadvantages, it has been proposed that various organic solvent coating formulations can be modified so that they could be applied from aqueous systems. In most applications the volatile organic solvent functions only as the solvent for the resin or adhesive and as the vehicle for the coating mixture. In such cases, adapting the formulation to a water-based system could be readily and directly accomplished by simply substituting a water soluble adhesive or by changing to an oil-in-water type emulsion system.

The solvent-based techniques for making heat sensitive coatings which are described above cannot be directly modified so as to be applicable as water-based systems because the volatile organic solvents act more than simply as the solvent for the resin or as the vehicle for the coating. It is the unique blushing phenomenon or the specific two component water and organic solvent composition that makes these formulations work. These coatings are opaque because of a physical structure which results directly from having a combination of water and organic solvent in the coating mixture. The organic solvent in these mixtures thus has a unique function and it is fundamentally not possible to make an opaque, heat-sensitive coating according to the concepts inherent in the previous techniques unless a volatile organic solvent is used.

The coatings made with the volatile organic solvent methods are, apart from the voids, continuous, homogeneous films wherein the resin particles are either completely or partially coalesced. Coatings made according to the present invention are heterogeneous, discontinuous, and the resin particles are still in substantially discrete particulate form. The physical structure of the coatings is in a way similar to a popcorn ball in which the individual popcorn particles are held together with candy, but the amount of candy used is not sufficient to fill the voids. The resin particles, comparable to the popcorn particles, are non-coalesced but flow together in response to a heated stylus, thereby eliminating the porous structure and transparentizing the coating.

The heat-sensitive recording material prepared according to this invention has been found to have good dimensional stability, pressure insensitivity, and wet-rub resistance. Moreover, these recording papers may be written upon by either pen or pencil and the temperature at which the coating becomes transparent in response to a stylus is low. The elimination of the need for a volatile organic solvent in the preparation of these recording papers results in both reduced cost and process simplification advantages.

The present invention provides a means for making an opaque heat-sensitive recording paper from a water-base coating system and is based upon the novel concept that a non-film forming, thermoplastic resin can be used as a "pigment" in the formation of the opaque heat-sensitive coating of the recording paper. The coating is advantageously prepared by mixing together in a suitable mixing device an emulsion or suspension of a thermoplastic resin with an adhesive in such a proportion that when the mixture is applied to a suitable backing and dried an opaque coating is obtained whereby the adhesive holds the resin particles together but does not completely fill in all the voids between the particles. The adhesive can be in the form of an emulsion or suspension or even a solution.

Coatings are opaque if they contain a sufficient number of interfaces between components having different indicies of refraction. Opacity is obtained in the pigmented coating according to this invention by using an amount of adhesive which will be insufficient to fill the voids between the pigment particles when they are applied upon a base. The attainment of opacity is dependent upon the coating being porous and containing, thereby, a sufficient number of air-pigment and/or air-adhesive interfaces. The opaque coating so obtained will be transparentized by heat when heat is applied to cause a sufficient portion of the air-pigment and/or air-adhesive interfaces to be eliminated. The thermoplastic characteristics of the "resinous pigment" cause it to flow together so as to eliminate the porous structure and become transparent. If this coating is on a dark colored sheet of paper a visible mark results.

The thermoplastic resin which can be used according to this invention is a non-film forming resin. By this term it is meant that the thermoplastic resin will not form a film at application and drying temperatures, but instead, the resin is capable of being mixed with a suitable adhesive and applied to a backing and dried to form a coating comprising discrete, microscopic, thermoplastic resin particles held together by the adhesive which is in an amount sufficient to bind the resin particles together but insufficient to completely fill the voids between the particles. The thermoplastic resin also should be capable of flowing together in response to a heated stylus so that the coating is thereby made transparent. It can readily be determined by one skilled in the art by routine experimentation which thermoplastic resins can be employed and which one is most suitable in any given coating formulation.

Many suitable thermoplastic resins may be used as the non-film forming "resinous pigments" according to this invention. Examples of these thermoplastic resins are: polyvinyl chloride (commercially available under the trade name Opalon 410), acrylic resin (commercially available under the trade name Rhoplex B-85), and particularly polystyrene (commercially available under the trade name Lytron S-2). Polystyrene may even be incorporated in the coating in its pulverized form, i.e., small irregularly shaped particles that will pass through a 325 mesh screen.

Various adhesives can be employed to form the coatings made with the non-film forming "resinous pigments." The primary requirement for the adhesive is that it possess sufficient binding ability so that when used in amounts substantially smaller than that volume needed to completely fill the voids between the resinous-pigment particles, it will adequately bind the particles into a porous coating and to the base. The adhesive need not be thermoplastic; however, thermoplasticity in the adhesive will increase the imaging sensitivity of the coating. The adhesive may be either of the emulsion type or of a type soluble in an aqueous system and in certain cases, it may be advantageous to employ a combination of adhesives. Representative examples of suitable adhesives include: polyvinyl acetate copolymer, manufactured by Borden under the trade name Polyco 678-W; butadiene styrene emulsion, manufactured by Dow under the trade name Latex 512-R; acrylic emulsion, manufactured by Rohm & Haas under the trade name Rhoplex B-15; acrylic emulsion, manufactured by Rohm & Haas under the trade name Rhoplex B-10; zinc caseinate, manufactured by Borden under the trade name Protovac 430.

The most suitable proportion of the adhesive to the thermoplastic resin will vary widely depending upon the particular adhesive or resin employed, the properties desired in the resulting product, etc. The ideal proportion of resin to adhesive can readily be determined by one skilled in the art. For example, since the dried coating must be opaque, the adhesive should be in an amount such that there is a sufficient number of air-pigment and/or air-adhesive interfaces present. Therefore, the voids between the resin particles should not be completely filled. On the other hand there must be sufficient adhesive to hold the resin particles together in the form of a porous coating. It has been found that a coating composition comprising about 26 parts of Rhoplex B-15, 59 parts Lytron S-2 and about 15 parts of a plasticizer, triphenyl phosphate, results in an excellent recording material which can be imaged at a rather low temperature, i.e., 85° C. Assuming the resinous "pigment" particles are substantially spherical in shape, it can be calculated that there will exist about 30% void space between the spheres. Thus, an adhesive having a density close to that of the resinous spheres would ordinarily be used in an amount equivalent to less than about 30% by weight based on the total weight of the coating. In certain instances, however, as would be readily ascertained by one skilled in the art, higher percentages of the adhesive can be used, as in Examples 1, 3 and 4, herein below, for the reason that the adhesive is apparently incompatible with the non-film forming resin in the sense that the adhesive does not efficiently fill all the voids between the resin particles. In like manner it has been found that at least about 5% of the adhesive should be used to hold the coating together. The amount of adhesive to use will vary somewhat depending upon the shape of the resinous particles. For example, resinous particles which were not substantially spherical would tend to have less void space between them and less adhesive would be needed to hold the resinous particles together.

Plasticizers, extenders, and additives may be employed in these coating compositions. For example, a plasticizer, which is solid at room temperature, may advantageously be employed in the amount equivalent to about 10–15% based on the weight of the composition.

The temperature at which the coating composition is blended together, of course, is not critical and can vary widely depending upon the particular components employed. For example, a temperature of about 50–60° C. has been found to be advantageous when mixing together a blend of an acrylic emulsion, triphenyl phosphate, and a polystyrene emulsion. In drying the coating, it is advantageous to apply a suitable degree of heat in order to speed up the drying process. The only requirement as to this temperature is that it not be so high as to destroy the porous structure of the coating or in any way substantially interfere with the heat sensitive properties of the coating.

The coating may be applied to any suitable backing material, usually colored paper, so that a visible contrast results when a portion of the coating is transparentized in response to heat, thus disclosing the backing material. A coating applied at a coating weight of about 11–14 pounds per ream of paper may be advantageously employed according to the present invention. The coating weight should preferably be higher than about 7 pounds per ream of paper. If lighter coat weights are used, they become less and less opaque and then fail to provide a strong visible contrast with the backing material.

The temperature required to transparentize these coatings will again vary widely depending upon the ingredients employed in the coating compositions. The heat should not be high enough to ignite the recording material or otherwise impair its integrity. A temperature as low as about 80° C. has been found to be sufficient in some applications.

The following examples illustrate the manner of producing the coating compositions according to this invention in more detail. Parts are by weight.

*Example 1*

A coating formula was prepared by mixing 12.5 parts of an acrylic emulsion (46% solids), manufactured by Rohm & Haas under the trade name Rhoplex B-15, and 37.5 parts of polystyrene emulsion (50% solids), manufactured by Monsanto under the trade name Lytron S-2. The mixture was applied to a black base paper at a coat weight of 11 pounds per ream and the coating was then dried. The coating was bright and could be transparentized by the application of heat to give a good contrasting image.

*Example 2*

A coating formula was prepared by mixing 8 parts of an acrylic emulsion (46% solids), manufactured by Rohm & Hass under the trade name Rhoplex B-10, and 50 parts of polystyrene emulsion (50% solids), manufactured by Monsanto under the trade name Lytron S-2, and 40 parts of casein ($NH_4OH$-cut, 10% solids). The mixture was applied to a black base paper at a coat weight of 11 pounds per ream and the coating was then dried. The coating was bright and could be transparentized by the application of heat to give a good contrasting image. This modification of Example 1 resulted in an improvement in pick resistance.

*Example 3*

A coating formula was prepared by warming 23 parts of Rhoplex B-15 (46% solids) to 50–60° C. and then gradually adding 7.5 parts of triphenyl phosphate while stirring slowly. The mixture was blended ta 50–60° C. until smooth, and then 69.5 parts of Lytron S-2 (50% solids) was added. Warm water was added to obtain the desired viscosity and the coating was applied to a black paper. This modification of Example 1 resulted in a sheet which could be imaged at a temperature of approximately 120° C.

*Example 4*

The same procedure was followed as shown in Example 3 except that 26 parts of Rhoplex B-15, 15 parts of triphenyl phosphate and 59 parts of Lytron S-2 were employed. This modification of Example 3 resulted in a sheet which could be imaged at a lower temperature (approximately 85° C.).

It is to be understood that the above examples are for the purpose of illustration only and that this invention includes all modifications and equivalents which fall within the scope of the appended claims.

I claim:

1. The method of preparing a heat sensitive recording material suitable for receiving inscriptions from a heated stylus which comprises providing a backing, applying thereto an aqueous coating composition comprising (a) non-film forming thermoplastic resinous particles and (b) at least about 5% by dry weight, of an organic, resinous adhesive, said particles characterized in that the particles are not film forming and are retained in particulate form under coating conditions, said adhesive characterized in that the adhesive forms a film under coating conditions and possesses sufficient binding ability to bind the particles when used in amounts substantially smaller than the volume needed to completely fill the voids between the resinous particles, said composition characterized in that it remains opaque due to the air-particle and/or air-adhesive interfaces when coated and dried at temperaturse below the fusion of the thermoplastic particles and that the resin particles flow at and above their fusion point to fill the voids and form a transparent mass that remains transparent on cooling, and drying the coating on the backing, said coating being applied at a coating weight equivalent to above about 7 pounds per ream of paper.

2. The method of claim 1 in which the thermoplastic resin is polystyrene.

3. The method of claim 2 in which the backing is paper.

References Cited by the Examiner

UNITED STATES PATENTS

| | | | |
|---|---|---|---|
| 2,574,439 | 11/1951 | Seymour | 260—45.5 |
| 2,848,751 | 8/1958 | Bechtold | 117—36.7 |
| 2,859,351 | 11/1958 | Clark et al. | 117—36.7 |
| 2,927,039 | 3/1960 | VanderWeel | 117—36.7 |
| 2,957,791 | 10/1960 | Bechtold | 117—36.7 |
| 2,962,382 | 11/1960 | Ives | 117—36.7 |
| 3,014,301 | 12/1961 | Grupe | 117—36.7 |
| 3,020,172 | 2/1962 | Mohnhaupt | 117—36.7 |
| 3,031,328 | 4/1962 | Larsen | 117—36.7 |
| 3,228,785 | 1/1966 | Growald et al. | 117—36.7 |

MURRAY KATZ, *Primary Examiner.*